(12) United States Patent
Collins et al.

(10) Patent No.: US 10,215,919 B2
(45) Date of Patent: Feb. 26, 2019

(54) OPTICAL COUPLING ARRANGEMENT

(71) Applicant: Huawei Technologies Co., Ltd., Shenzhen (CN)

(72) Inventors: Tom Collins, Munich (DE); Marco Lamponi, Gent (BE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/679,875

(22) Filed: Aug. 17, 2017

(65) Prior Publication Data

US 2017/0343734 A1 Nov. 30, 2017

Related U.S. Application Data

(63) Continuation of application No. PCT/CN2015/095117, filed on Nov. 20, 2015.

(30) Foreign Application Priority Data

May 5, 2015 (EP) .................................... 15166358

(51) Int. Cl.
*G02B 6/12* (2006.01)
*G02B 6/122* (2006.01)
*G02B 6/30* (2006.01)

(52) U.S. Cl.
CPC ....... *G02B 6/1228* (2013.01); *G02B 6/12002* (2013.01); *G02B 6/305* (2013.01); *G02B 2006/12147* (2013.01)

(58) Field of Classification Search
CPC .................................................. G02B 6/1228
See application file for complete search history.

(56) References Cited

U.S. PATENT DOCUMENTS 7,539,373 B1 5/2009 Logvin et al.
8,483,528 B2 * 7/2013 Socci ...................... G02B 6/305
385/131

(Continued)

FOREIGN PATENT DOCUMENTS

CN 1685256 A 10/2005
CN 102565955 A 7/2012

(Continued)

OTHER PUBLICATIONS

Zimmermann et al., "g-Pack—a generic testbed package for Silicon photonics devices," IEEE Group IV Photonics, pp. 371-373, Institute of Electrical and Electronics Engineers, New York, New York (2008).

(Continued)

*Primary Examiner* — Omar R Rojas
(74) *Attorney, Agent, or Firm* — Leydig, Voit & Mayer, Ltd.

(57) ABSTRACT

An optical coupling arrangement is provided, comprising a lightwave circuit (LC), a coupling element and an optical waveguide element, wherein the lightwave circuit has a first surface area and wherein the coupling element is attached to the first surface area) such that an optical signal can be transmitted from the lightwave circuit to the coupling element. The optical waveguide element is attached to the coupling element at a first junction zone such that the optical signal can be transmitted from the coupling element to the optical waveguide element). The coupling element is configured to perform mode transformation to the optical signal transmitted from the lightwave circuit to the optical waveguide element and such that adiabatic coupling of the optical signal to the optical waveguide element is enabled. Thus, a better coupling efficiency can be achieved.

15 Claims, 3 Drawing Sheets

(56) References Cited

U.S. PATENT DOCUMENTS

| | | | |
|---|---|---|---|
| 8,724,937 B2* | 5/2014 | Barwicz | G02B 6/30 385/14 |
| 2003/0169422 A1 | 9/2003 | Mukai | |
| 2005/0123244 A1 | 6/2005 | Block et al. | |
| 2007/0071385 A1 | 3/2007 | Dorrer et al. | |
| 2007/0242917 A1 | 10/2007 | Blauvelt et al. | |
| 2014/0111293 A1 | 4/2014 | Madeberg et al. | |
| 2014/0153600 A1 | 6/2014 | Luo et al. | |

FOREIGN PATENT DOCUMENTS

| | | |
|---|---|---|
| CN | 103650235 A | 3/2014 |
| WO | WO 03079053 A2 | 9/2003 |
| WO | WO 2008022609 A1 | 2/2008 |

OTHER PUBLICATIONS

Kopp et al., "Silicon Photonic Circuits: On-CMOS Integration, Fiber Optical Coupling, and Packaging," IEEE Journal of Selected Topics in Quantum Electronics, vol. 17, No. 3, pp. 498-509, Institute of Electrical and Electronics Engineers, New York, New York (May/Jun. 2011).

Tekin et al., "Fibre-Array Optical Interconnection for Silicon Photonics," IEEE European Conference on Optical Communication, Brussels, Belgium, Institute of Electrical and Electronics Engineers, New York, New York (Sep. 21-25, 2008).

Bakir et al., "Low-Loss (<1 dB) and Polarization-Insensitive Edge Fiber Couplers Fabricated on 200-mm Silicon-on-Insulator Wafers," IEEE Photonics Technology Letters, vol. 22, No. 11, pp. 739-741, Institute of Electronics and Electronics Engineers, New York, New York (Jun. 1, 2010).

Vernooy et al., "Alignment-Insensitive Coupling for PLC-Based Surface Mount Photonics," IEEE Photonics Technology Letters, vol. 16, No. 1, pp. 269-271, Institute of Electrical and Electronics Engineers, New York, New York (Jan. 2004).

Meany et al., "Towards low-loss lightwave and circuits for non-classical optics at 800 and 1,550 nm," Applied Physics A, vol. 114, Issue 1, Springer Link, Heidelberg, Germany (Jan. 2014).

Meany et al., "Non-classical interference in integrated 3D multiports," Optics Express, vol. 20, No. 24, Optical Society of America (2012).

"Optoscribe—Leading the 3D Light Revolution," pp. 1-3 (Downloaded Aug. 1, 2017).

Brusberg et al., "Single-mode Glass Waveguide Platform for DWDM Chip-to-Chip Interconnects," IEEE Electronics Components and Technology Conference, pp. 1532-1539, Institute of Electrical and Electronics Engineers, New York, New York (2012).

Lee et al., "20-μm-Pitch Eight-Channel Monolithic Fiber Array Coupling 160 Gb/s/Channel to Silicon Nanophotonic Chip," IEEE Optical Fiber communication (OFC), National Fiber Optic Engineers Conference, Institute of Electrical and Electronics Engineers, New York, New York (2010).

* cited by examiner

OPTICAL COUPLING ARRANGEMENT

CROSS-REFERENCE TO RELATED APPLICATIONS

This application is a continuation of International Application No. PCT/CN2015/095117, filed on Nov. 20, 2015, which claims priority to Europe Patent Application No. EP15166358.0, filed on May 5, 2015. The disclosures of the aforementioned applications are hereby incorporated by reference in their entireties.

TECHNICAL FIELD

Embodiments of the present invention relate to the technical field of optics and photonic integrated circuits, particularly to an optical coupling arrangement which is configured to couple optical signals from one optical component to another optical component. Further, a method for producing a coupling element for an optical coupling arrangement is stated.

BACKGROUND

Optical elements are widely used for transmitting optical signals between data exchanging devices and/or communication devices.

Silicon photonics, for example, is rapidly gaining importance as a generic technology platform for a wide range of applications in telecom, datacom, interconnect and sensing. It allows implementing photonic functions through the use of complementary metal-oxide semiconductor (CMOS) compatible wafer-scale technologies on high quality, low cost silicon substrates.

Especially for short distance applications like data communication (datacom), interconnect or access network, the device price may be a major concern. Thanks to silicon mass production, the price of a photonic chip integrating hundreds of basic building blocks can be extremely cheap and economically advantageous. However, the packaging cost can significantly exceed the cost of the single chip so that the final device price can be too high to meet economical market needs or requirements.

The need for efficient fiber coupling may be one of the main reasons for such a high photonics packaging cost. Connecting an optical fiber to a millimeter scale chip may often involve complex alignment procedures with tight mechanical tolerances.

D. W. Vernooy et al., Alignment-Insensitive Coupling for PLC-Based Surface Mount Photonics, IEEE PTL, 2004 describes a way of using adiabatic coupling between III-V chips and silica planar lightwave circuit (PLC). The technology enables surface mount flip-chip of III-V components onto PLC platform with loss <0.5 dB between chips. The III-V chip has a low index contrast output waveguide and the light is transferred from the InP waveguide into this waveguide. (There may be an additional 2 dB on chip loss where the light transitions from III-V to this output waveguide). This allows the mode to expand significantly and can be coupled to a waveguide on the PLC (also low index contrast) provided the surface mount brings them into close enough proximity.

T. Meany, et al., Appl. Phys. A 114 (1), 113-118 (2013) describes using femto-second lasers to write waveguides in glass. This technique is called femto-second laser direct-write (FLDW) and is based on the non-linear absorption of high intensities pulses in a transparent material. As a result, when a laser is focused below the surface of a transparent material, due to a nonlinear effect, the absorption is highly localized at the laser focus point. At low intensities of the laser, a modification of the material's refractive index can be observed, by translating the substrate with respect to the laser focus, it is possible to form a waveguide. This can occur in three dimensions and means that this technique can easily produce low-loss waveguiding at multiple depths.

SUMMARY

An object of an embodiment of the present invention is to provide a cost effective solution to the fiber coupling problem, and thus in particular paving the way for a large number of low cost silicon photonics chip based products.

Several aspects of the following description are based on the following considerations and findings:

Topside coupling may be considered a well established way to couple light inside a chip waveguide. Compared to the standard horizontal coupling it may present two main advantages, namely:

Wafer level testing: as the light is coming out vertically from the surface of the die the wafer may not need to be diced to allow chip testing. Good chips may be distinguished from bad chips at an early stage allowing for massive cost reduction.

Compatible with Chip-On-Board (COB) packaging: topside coupling scheme may be perfectly suited for Chip-On-Board applications as it allows for topside connector which is a well established connection scheme.

Topside coupling is obtained using dedicated grating structures capable of scattering the light in the vertical direction with minimum losses. This technology is well established in silicon photonics. However this technology may present some limitations:

First, the losses of such a structure may have a strong wavelength dependence, relatively low for the optimum wavelength (<1.5 dB) but the losses may increase rapidly moving to higher or lower wavelength.

Second, they are polarization sensitive. To handle TE and TM polarization at the same time may involve much more complex structures with higher losses and tighter alignment tolerances.

Grating couplers lead to a vertical or quasi-vertical optical coupling of the light between a fiber and a nanophotonic circuit. This way, they can be located anywhere over the chip and not only at the edge. Therefore, compared with edge-coupling structures, such surface couplers may allow light coupling without the need for dicing and polishing the chip edge, which also makes wafer-scale testing of nanophotonic circuits possible.

In a typical grating coupler structure for silicon photonics, the optical mode coming from the waveguide is scattered by the gratings to a vertical direction, and the grating also modifies the shape of the mode to match the mode field diameter (MFD) of a single mode fiber.

A g-Pack packaging approach to bread boarding of Silicon photonics chips provides optical input output through a fiber array coupled to gratings couplers.

An alternative approach to coupling to the waveguide is to couple horizontally to the side of the chip (horizontal coupling). Silicon or silicon nitride waveguides have a typical optical mode field diameter (MFD) of around 1 µm. However, to enable data transmission any chip need to be interfaced with an optical fiber that have a much larger MFD (10 µm). Due to this mismatch in size a coupling structure is needed in order to minimize the coupling losses. This structure enlarges the small waveguide mode to adapt it to the wider fiber mode.

In one typical solution, the size of the silicon waveguide is tapered down to allow an increase of the MFD. To reduce the scattering losses coming from a change in the waveguide dimension the transition needs to happen over a certain minimum distance, if the taper length exceeds this length the transition is almost lossless and the taper is said to be adiabatic.

Adiabatic solutions may present potentially very low losses which could reach 0.5 dB, and they may be intrinsically wideband. Adiabatic solutions may not be suited for vertical coupling and may be difficult to envisage as chip-on-board compatible.

Based on the preceding discussions, it may be an aim to design a wideband coupling scheme for silicon photonics which uses the top side of a wafer and is compatible with chip-on-board packaging.

According to an aspect of the invention, an optical coupling arrangement is provided. The optical coupling arrangement comprises a lightwave circuit (LC), a coupling element and an optical waveguide element. The lightwave circuit has a first surface area and the coupling element is attached to the first surface area such that an optical signal can be transmitted from the lightwave circuit to the coupling element and vice versa. The optical waveguide element is attached to the coupling element at a first junction zone such that the optical signal can be transmitted from the coupling element to the optical waveguide element and vice versa. The coupling element is configured to perform mode transformation to the optical signal transmitted from the lightwave circuit to the optical waveguide element, in particular such that adiabatic coupling of the optical signal to the optical waveguide element is enabled.

The optical coupling arrangement as described herein provides a coupling scheme which has the structural advantages of the topside coupling (compatible with COB packaging) and at the same time the benefits of the horizontal coupling related to the optical coupling, i.e. higher coupling efficiency. The optical coupling arrangement is compatible with chip-on-board packaging (enables high package density) and at the same time provides good optical coupling efficiency.

The lightwave circuit (LC), may particularly be a planar lightwave circuit (PLC). A PLC can be any optical integrated circuit or optical circuit board using optical waveguides to route optical signals. The optical waveguide element may, for example, be an optical fiber waveguide.

Modal transformation of the optical signal is achieved by adiabatically changing the dimensions and/or refractive index of the waveguide along its length. In the specific case of making an interface to SMF (single-mode fiber) fiber as the optical waveguide element, the waveguide could be, for example, 8×8 µm cross section at the first junction zone. In contrast the waveguide could be 4 µm or less at the first surface area; adiabatic coupling is achieved by converting from one refractive index to another without reflection.

An offset may be provided between the first junction zone and the first surface area such that the first junction zone is spaced apart from the first surface area, for example in a direction perpendicular to the first surface area.

The mode transformation occurs by transmission of the light through a waveguide which adiabatically changes its physical properties e.g. dimensions or refractive index. The coupling element is structurally formed such that requirements of the waveguide for the mode transformation with low optical loss are achieved.

The coupling element may have multiple functions, like: optical coupling, mode convertor, mechanical fixation of the optical waveguide element, and it may contain passive optical function elements. The coupling element may be made out of silicon, for instance a silicon block having a 3D waveguide inside it.

Additionally or alternatively, femto-second lasers may be used to change the refractive index of a range of materials that may be referred to as "glass" but ranging from $SiO_2$ grown on silicon and doped silica to special glasses.

It should be noted that when referring to a glass block in the following, the respective statement does also generally relate to the coupling element and vice versa. Similarly, when referring to a lightwave circuit (LC), a planar lightwave circuit (PLC), a photonics integrated circuit (PIC), or a silicon PIC, the respective statements and passages also refer to the other elements. In particular, PLC, PIC, and silicon PIC may be considered specific embodiments of a lightwave circuit.

The coupling element is configured to transfer light from the waveguide on the lightwave circuit to fiber (typically single mode fiber). The mode size may be different. Also the coupling element can be given structure to support the fiber (e.g., a groove). In the following, when referring to the coupling element or to any embodiment of a coupling element, for example to a glass block, the respective statements and passages also refer to the other one.

In other words, it is one aspect of the invention to use a glass block as a mode convertor between the waveguide on the lightwave circuit and the fiber. Using FLDW techniques a 3D waveguide can be written on the glass. The glass waveguide can be written to allow adiabatic coupling to the silicon nitride waveguide (LC) on one side and butt coupling to the fiber on the other side. Using bonding technique pieces of glass can be easily bonded on top of silicon photonic wafers.

The optical coupling arrangement presents a cheap, wideband, vertical approach for coupling silicon photonic chip to a standard single mode fiber, i.e. to the optical waveguide element. This solution is particularly suited for Chip-On-Board applications and allows the fabrication of innovative devices for this market. The overall process can be implemented at a wafer level using available techniques and some of the following design concepts: die bonding with pick and place machine (to attach glass block to silicon photonics chip), femto-second light direct write technique, adiabatic coupling approach, fiber alignment to mechanical features (e.g. V-grooves).

The optical coupling arrangement as described herein allows for cheap packaging. The fiber can be easily glued on the glass, and the alignment tolerance can be relaxed using V-grooves in the glass die. The optical coupling arrangement can be also used with fiber arrays and allows vertical testing of the devices.

In other words, the optical coupling arrangement and its functioning may be described as follows: it relates to a coupling scheme between a planar waveguide (LC; PLC, on a chip, for example) and a SMF fiber (optical waveguide element) whereby light is adiabatically coupled from the waveguide on the chip to a waveguide in a glass block (coupling element) and light is coupled from the glass block to an SMF fiber attached to the glass block. In particular, where the waveguide in the glass block couples the waveguide in the PLC, the waveguide is very close to the surface of the glass block (<2 µm). In particular, where the waveguide in the glass block butt-couples to the SMF fiber, the waveguide is buried within the block so that sufficient area of the block is available to directly bond the fiber to the surface (>30 μm below the surface).

The waveguide may be written in the glass block with a femto-second laser and the waveguide in the glass block may be defined using ion exchange processes.

An application scenario of an optical coupling arrangement as described herein may be the following:

The optical coupling arrangement may be used with all silicon photonic circuits needed to be coupled to SMF fiber. In some applications, it may be feasible to use lenses and free space optics. Packaging cost of the component may be dramatically reduced if the technology is compatible with non-hermetic environments and even more if the technology is compatible with chip-on-board technology. The applications which would particularly benefit from this optical coupling arrangement may include lower cost, high volume components such as fiber to the home (FTTH) components and components to serve access and datacenter markets. One example could be the QSFP28 4×25 Gbps development.

One alternative approach is not to utilize broadband coupling. In this case parallel fiber solutions may be used.

According to an embodiment of the invention, the junction zone is arranged at a lateral surface area of the coupling element and the lateral surface area of the coupling element extends perpendicular to the first surface area of the lightwave circuit.

This arrangement enables horizontal coupling of the optical waveguide without resulting in increased package density. Horizontal coupling may be defined in that at least a section of the optical waveguide, typically an end section coupled to the coupling element, extends parallel or substantially parallel to the first surface area of the lightwave circuit. The coupling element can be located anywhere on the first surface area of the lightwave circuit. In contrast to top side coupling (optical waveguide extends perpendicular to the first surface area), horizontal coupling enables package density improvements.

According to a further embodiment of the invention, the coupling element is an element comprising at least one optical path optically connecting the junction zone with the first surface area of the lightwave circuit.

The optical path may be described as an optical connection or a light conducting path, configured to transmit light from the lateral surface area (connected to the optical waveguide, for example the SMF) to the lightwave circuit.

The coupling element can be particularly cuboidal and/or solid. The optical path within the coupling element is designed such that it allows adiabatic coupling to the lightwave circuit and butt coupling to the optical waveguide element.

According to a further embodiment of the invention, the at least one optical path extends perpendicular to the lateral surface area and along a bottom surface area of the coupling element.

Particularly, at least a first end section of the optical path is perpendicular to the lateral surface, wherein the first end section is that section which is configured to be optically coupled to the optical waveguide or SMF.

A second end section of the optical path may be close to the bottom surface area, for example about 3 μm and may extend along the bottom surface area. This arrangement allows adiabatic coupling.

According to a further embodiment of the invention, the coupling element is a glass block used as a mode converter between the lightwave circuit and the optical waveguide element.

According to a further embodiment of the invention, an optical waveguide is arranged at the first surface area of the lightwave circuit and the coupling element and a coupling region are configured to transmit an optical signal to the optical waveguide. The optical waveguide comprises a core, an upper cladding and a lower cladding, wherein a refractive index of the upper cladding is lower than a refractive index of the optical path in the coupling element.

This arrangement may contribute to enabling adiabatic coupling of optical signals from the core of the optical waveguide to the optical path of the coupling element.

According to a further embodiment of the invention, the optical waveguide at least partially extends along a bottom surface area of the coupling element.

In other words, the bottom surface area of the coupling element at least partially covers or overlaps the optical waveguide in the lightwave circuit. The optical waveguide at the first surface area of the lightwave circuit may be a medium or high index contrast waveguide and may at least partially extend between the coupling element and the lightwave circuit.

Thus, an adiabatic taper can be realized on the optical waveguide during the wafer fabrication.

According to a further embodiment of the invention, an end section of the optical waveguide is tapered towards an end of the optical waveguide. Alternatively or additionally, an end section of the core is tapered towards the end of the optical waveguide. Alternatively or additionally, an end section of the optical path is tapered towards an end of the optical path. The end section is preferably tapered down to a point.

Thus, an effective refractive index of the optical waveguide is reduced towards its end.

According to a further embodiment of the invention, the end section of the optical path and the end section of the optical waveguide are arranged in a coupling region where light is coupled from one of the optical path and the optical waveguide to the other one.

The end section of the optical path and the end section of the optical waveguide may particularly be arranged such that they overlap each other in a longitudinal direction of the optical path and the optical waveguide. The optical waveguide tapers down towards its end so that the effective refractive index of the optical waveguide is reduced to less than the effective refractive index of the optical path in the coupling element such that light is adiabatically coupled.

Particularly, the tapered end sections of the optical waveguide and the optical path are tapered in opposite directions such that the refractive index of one is decreasing and the refractive index of the other one is increasing (this applies coming from both directions of the optical path and the optical waveguide, depending on a light transmission direction) and light is coupled from the one to the other.

According to a further embodiment of the invention, a first recess is formed in the first surface area of the lightwave circuit and a first filler material is inserted in the first recess, wherein a refractive index of the first filler material is lower than a refractive index of the upper cladding and/or lower cladding, wherein the first filler material at least partially extends along a bottom surface area of the coupling element.

The first filler material having a refractive index in the specified range may contribute to enabling adiabatic transition from the optical waveguide of the lightwave circuit to the optical path within the coupling element.

That the filler material at least partially extends along the bottom surface area of the coupling element may be understood such that the filler material may be inserted to the recess and that the filling level at least at one point of the surface area of the lightwave circuit is flush with this surface such that the filler material directly contacts the bottom surface area of the glass block.

The filler material has the following role. Optical signals will be led through or will be guided through the arrangement as optical signals tend towards high refractive index (RI) material. Thus, light stays in the core because the lower cladding may be thick enough and has a lower refractive index than the core. The light stays in the optical waveguide. In the coupling region the core is tapered down and terminates. At this point the light spreads into the upper and lower cladding. If the substrate has a higher refractive index than the cladding then light could be guided to the substrate rather than going to the coupling element. Therefore it needs to be separated from the silicon by a relatively thick region with a refractive index less than both the lower cladding and the silicon.

In one embodiment, a refractive index of the optical path in the coupling element is higher than a refractive index of the upper cladding of the optical waveguide and higher than a refractive index of the lower cladding of the optical waveguide. This may increase coupling efficiency.

According to a further embodiment of the invention, the upper cladding of the optical waveguide comprises a second recess and the coupling element is arranged in the second recess.

Thus, the optical path in the coupling element is closer to the core of the optical waveguide and the coupling efficiency may be increased.

According to a further embodiment of the invention, the upper cladding of the optical waveguide comprises a second recess and a second filler material is arranged in the second recess, wherein a refractive index of the second filler material is higher than the refractive index of the upper cladding and lower cladding.

Thus, the refractive index of the path of optical signals from the optical waveguide to the optical path in the coupling element changes smoothly and thus enables high coupling efficiency.

According to a further embodiment of the invention, an optical path extends through the coupling element from the junction zone to an opposite second lateral surface area of the coupling element, wherein the optical waveguide is optically coupled to the second lateral surface area, wherein the coupling element is configured to transmit optical signals from the second lateral surface area to the first junction zone via the optical path.

According to a further aspect of the invention, a method for producing a coupling element for an optical coupling arrangement is provided. The coupling element produced by this method particularly corresponds to the coupling element described with reference to the optical coupling arrangement. The method comprises the steps of: providing an optical path within a three-dimensional block of transparent dielectric material, wherein the optical path is inclined with respect to a bottom surface area of the three-dimensional block of transparent dielectric material and removing material from the bottom surface area until the optical path exits from the three-dimensional block of transparent dielectric material at the bottom surface area.

At least a section of the optical path is inclined with respect to the bottom surface of the optical path and after the step of removing material from the bottom surface, an end section of the optical path is close to the bottom surface and extends at least partially along the bottom surface.

The optical path corresponds to a waveguide in the block and the method results in tapering the optical path to a point so as to form a narrow tip at an end of the optical path. Thus, efficiency of adiabatic coupling is improved. The three-dimensional block may particularly be a cuboidal block.

The step of removing material from the bottom surface area is carried out such that the bottom surface area of the glass block is even/flat after this step. For this step, chemical and/or mechanical polishing may be applied to the surface area. In one embodiment, the step of removing material may be repeated multiple times. Thus, material is removed stepwise in subsequent steps and may be described as being removed in layers, wherein several layers are removed consecutively.

This method may be used to produce an optical coupling arrangement as described above and may further comprise the steps of: optically coupling the coupling element to a surface area of a lightwave circuit; and optically coupling a waveguide element to a lateral surface area of the coupling element.

According to a further embodiment of the method, an end section of the optical path is linear and intersects the bottom surface area at an inclination angle between 5° and 45°.

Particularly, the end section of the optical path concludes at the bottom surface area and is inclined relative to the bottom surface area at an angle said above. A vertical taper increases the effective index change along the taper and thus the coupling efficiency is improved.

The method and the structure of the optical coupling element may in other words be described as following:

A vertical taper may be made in the glass block by writing the waveguide at a slight angle to the surface. The waveguide in the glass block may be aligned to mechanical features in the block. These features may later be used to passively align the SMF fiber. The coupling element may comprises multiple waveguides to couple light between multiple planar waveguides on the wafer and multiple fibers.

The optical coupling element enables a coupling scheme between a planar waveguide (on a chip) and a SMF fiber whereby at least some of the following characteristics are provided: light is butt coupled from the waveguide on the chip to a waveguide in a glass block, light is coupled from the glass block to an SMF fiber attached to the glass block, where the waveguide couples to the waveguide in the PLC, the waveguide may be set close to the surface of the glass block (at a height to vertically align to a PIC), using a reference height from the PIC (e.g. interface between substrate and underclad oxide), where the waveguide butt-couples to the fiber, the waveguide is buried within the glass block so that sufficient area of the block is available to directly bond the fiber to the surface (>30 μm below the surface, for example).

The waveguide in the glass block may be written with a femto-second laser and/or the waveguide in the glass block may be defined using ion exchange processes. The waveguide in the glass block may be aligned to mechanical features in the block. These features are later used to passively align the SMF fiber. Multiple waveguides may be comprised in the glass block to couple light between multiple planar waveguides on the wafer and multiple fibers.

BRIEF DESCRIPTION OF THE DRAWINGS

Embodiments of the invention will be described with respect to the following figures, in which.

DETAILED DESCRIPTION OF EMBODIMENTS

Figure 1:
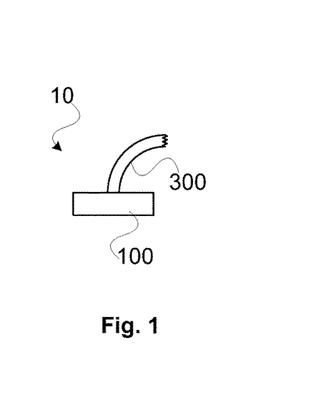
FIG. 1 shows a schematic illustration of a topside coupling scheme.

FIG. 1 shows an optical coupling arrangement 10 where an optical waveguide element 300 is coupled to a lightwave circuit 100 using the topside coupling scheme. At least an end section of the waveguide element 300 being attached to the lightwave circuit 100 extends perpendicular or substantially perpendicular to the surface area of the lightwave circuit 100 the optical waveguide element 300 is attached to.

Figure 2:
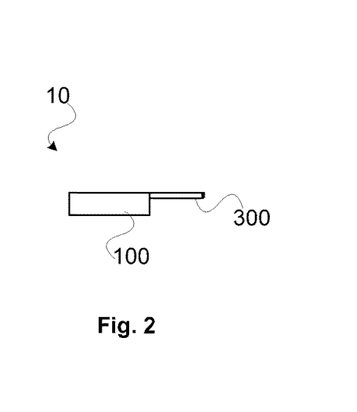
FIG. 2 shows a schematic illustration of a side coupling scheme.

FIG. 2 shows a side coupling scheme of an optical waveguide element 10 where the waveguide element 300 is coupled to a side of the lightwave circuit 100. The waveguide element 300 extends laterally from the lightwave circuit 100 and thus enable an improved package density of optical components, as described above.

Figure 3:
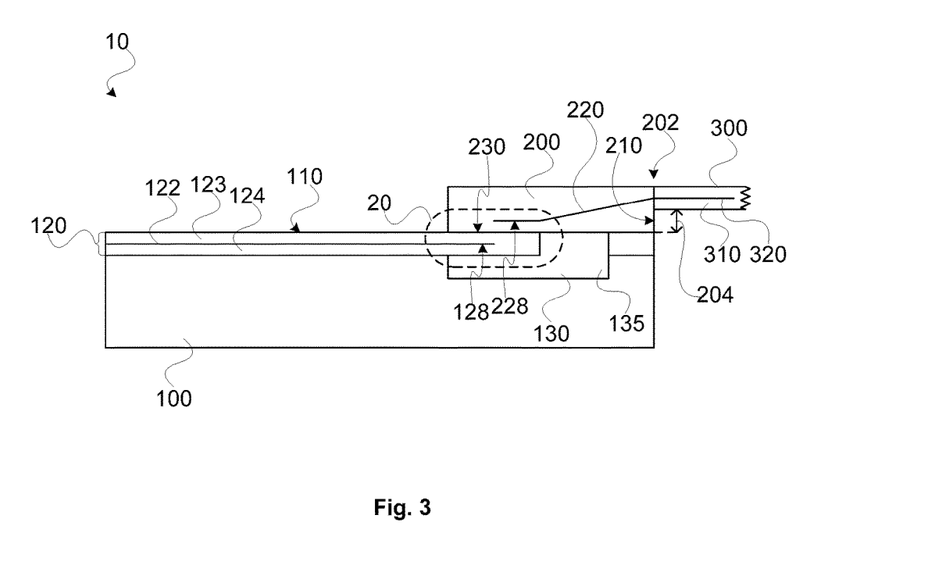
FIG. 3 schematically shows an optical coupling arrangement according to an exemplary embodiment of the invention.

FIG. 3 shows an optical coupling arrangement 10 with a lightwave circuit 100, a coupling element 200 and an optical waveguide element 300 comprising a core 320 and a cladding 310.

The coupling element 200 may be a glass block having a lateral surface area 210, a bottom surface area 230 and an optical path extending from the lateral surface area 210 to the bottom surface area 230. A first junction zone 202 is provided at the lateral surface area 210 and the optical waveguide element 300 is optically coupled with the optical path 220 at the first junction zone 202. A perpendicular offset 204 is provided between the first junction zone 202 and the bottom surface area 230 such that the optical waveguide element 300 is spaced apart from a first surface area 110 of the lightwave circuit 100.

Along the first surface area 110 of the lightwave circuit 100, an optical waveguide 120 is provided, wherein the optical waveguide 120 comprises a core 122, an upper cladding 123 and a lower cladding 124, which cladding 123, 124 surround or enclose the core 122.

Figure 4:
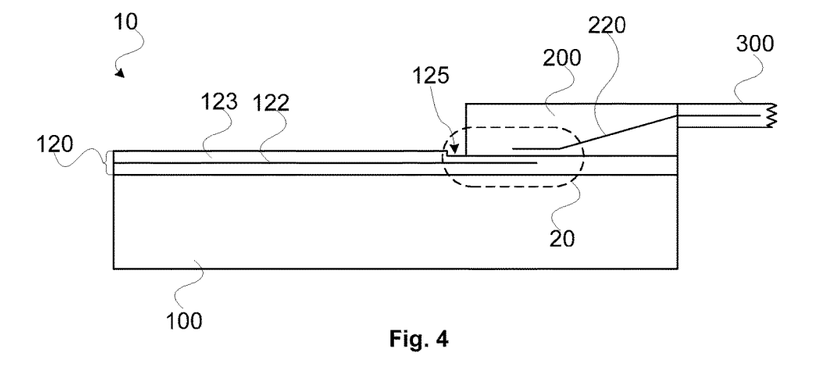
FIG. 4 schematically shows an optical coupling arrangement according to an exemplary embodiment of the invention.

A first recess 130 is provided in the first surface area 110 and the first recess 130 is filled with a first filler material 135. The refractive indices of the upper and lower cladding and the first filler material are adjusted such that in a coupling region 20 optical coupling from the core 122 to the optical path 220 is enabled. Particularly, the arrangement enables optical coupling between an end section 128 of the optical waveguide 120 and an end section 228 of the optical path 220. The end sections 128 and 228 may overlap along the first surface area 110, i.e. from the left to the right in FIG. 3, for example, as shown in FIG. 4 or may not overlap, as shown in FIG. 3.

In this embodiment, an adiabatic taper can be realized on the high or medium index contrast waveguide 120 during the wafer fabrication. Such a taper will allow for low losses and wideband operation on both TM and TE polarization as the light is transferred to the silica waveguide formed by the under and overclad oxide 123, 124.

The substrate is removed under the waveguide 120 (the waveguide 120 may for example be a silica waveguide and the substrate may be a silicon substrate) and back-filled with a low index material, namely the first filler material 135 (e.g. polymer). The same or similar low index material is needed between the glass block 220 and the silica waveguide 100. As can be seen in FIG. 3, the optical waveguide 120 does not extend along the complete bottom surface area of the coupling element 200. At least partially, the first filler material touches the bottom surface of the coupling element 200.

Optionally a further thin medium index contrast waveguide can be added to help the adiabatic transition to the glass block (depending on the refractive index of the glass block and the waveguide written in it). This further thin medium index contrast waveguide may be located on top of the upper cladding 123 and immediately below the coupling element 200, particularly arranged in the coupling region 20.

The optional thin waveguide layer can be added above the oxide upper cladding. One example could be a 70-100 nm SiN layer. In this case the light transitions from the core waveguide to the waveguide formed in silica by the upper and lower cladding, and then to the thin waveguide layer. Finally the light transitions from this thin waveguide layer to the glass block.

On the other side of the glass waveguide 220 a fiber 300 can be easily glued or welded to the glass block 200 at the first junction zone 202. As the glass waveguide MFD is very close to the fiber MFD, the losses can be extremely low.

FIG. 4 shows an embodiment of the optical coupling arrangement 10 already discussed with reference to FIG. 3.

A second recess 125 may be formed in the upper cladding 123 of the optical waveguide 120 on top or on the first surface area 110 of the lightwave circuit 100. The second recess 125 may particularly be provided in the coupling region 20.

In this embodiment, the upper cladding 123 is mostly removed above the high or medium index waveguide 120. The upper cladding 123 is removed over a large enough area to allow the glass block 220 to be placed in close proximity to the thin medium index contrast waveguide, i.e. close to the core 122 of the optical waveguide 120. This implementation may avoid the silicon substrate removal and use of polymer, as shown with the first recess and the first filler material in FIG. 3.

Figure 5:
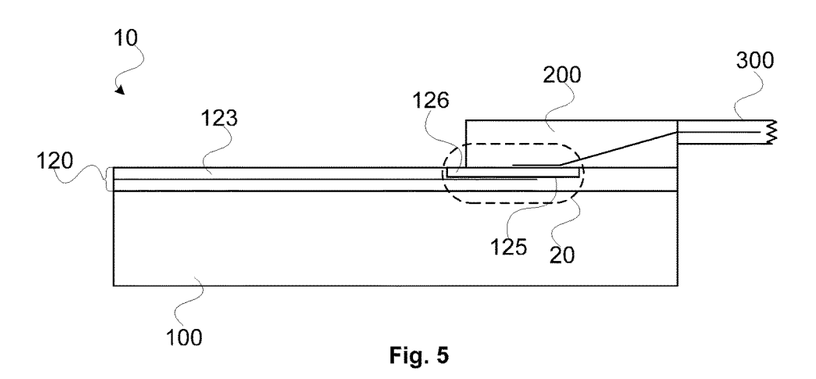
FIG. 5 schematically shows an optical coupling arrangement according to an exemplary embodiment of the invention.

FIG. 5 shows an optical coupling arrangement 10 where the upper cladding 123 is partially removed below the coupling element 200 such that a second recess (as already shown in FIG. 4) is formed, wherein the second recess is filled with a second filler material 126.

A refractive index of the second filler material 126 is higher than the refractive index of the upper cladding 123 and lower cladding 124. Thus, the refractive index of the path of optical signals from the optical waveguide 120 to the optical path 220 in the coupling element changes smoothly and thus enables high coupling efficiency in the coupling region 20.

Figure 6:
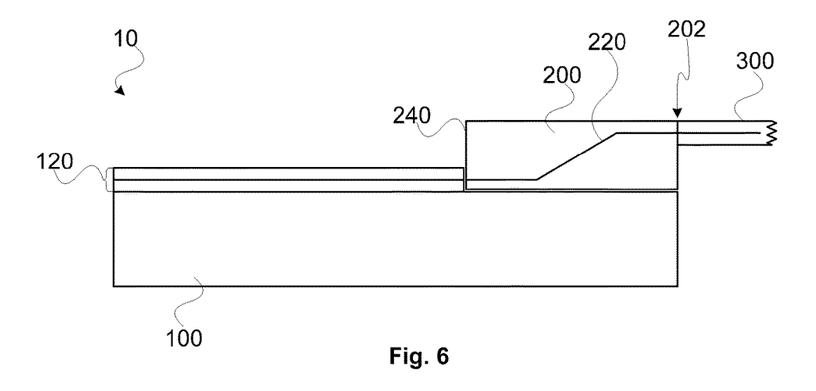
FIG. 6 schematically shows an optical coupling arrangement according to an exemplary embodiment of the invention.

FIG. 6 shows an optical coupling arrangement 10 where the evanescent coupling is replaced with a butt coupled approach between PIC waveguide 120 and glass block 200. The glass block 200 again functions as a mode convertor. Passive alignment of the glass block 200 is possible with low loss as the vertical alignment can use a known reference. In this example the interface between the silicon substrate and the oxide cladding is used.

The SMF 300 may be easily aligned to the waveguide 220 written in the glass block 200. At the same time as writing the waveguide in the glass block, and with the same machine, mechanical features may be defined in the glass block (e.g. V-groove). This may be done by using the femto-second laser to induce 'damage' in the glass block which will increase the etch rate in appropriate chemicals very significantly. After the laser write process is complete the wafer may be chemically processed to create the mechanical alignment features.

The processes described above can be done at wafer level ensuring low cost. Once the waveguide and mechanical features are created the wafer can be diced into individual glass blocks.

It may be desirable to align and attach the glass block to the planar lightwave circuit chip whilst the chip is still in wafer form. In this case a fiber could be easily aligned and glued on the right position on the glass using the mechanical feature after dicing the silicon photonics wafer and attaching the chip to a board or in a package. Alternatively the fiber can be attached to the glass block and the glass block aligned after attaching the chip to a board or package. These options can be described as follows:

Define mechanical features; write waveguide; polish to vertically taper waveguide; singulate glass blocks; after this step, the glass block is completed and the following two options can be chosen:

In option 1, after this step the photonics wafer with the silica waveguide taper is aligned (passive) and bonded to the glass block, singulated into die; mounted die in/on carrier/PCB/package, wire bonded; and aligned (active) and bonded SMF fiber.

In option 2, the fiber is attached to the glass block first and the photonics wafer with the silica waveguide taper is singulated into die; mounted die in/on carrier/PCB/package, wire bonded; and the bond block is aligned (active) and bonded with fiber.

Figure 7A:
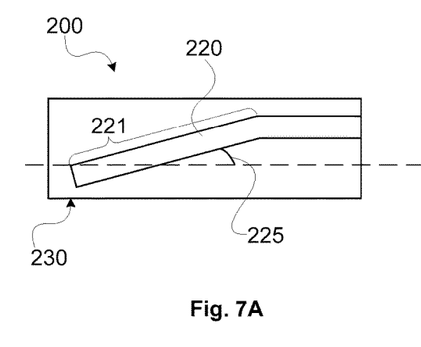
FIGS. 7A and 7B schematically show a coupling element at subsequent stages of a method according to an exemplary embodiment of the invention.
Figure 7B:
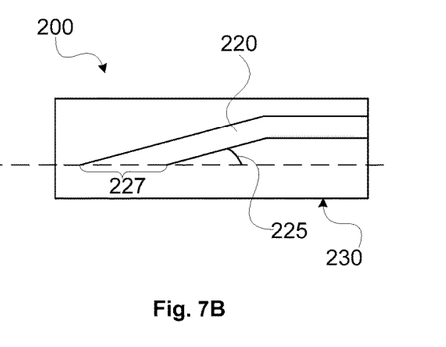

FIGS. 7A and 7B schematically show preparation of a coupling element 200 with an optical path 220 arranged within the coupling element 200. An end section 221 is inclined with respect to a bottom surface 230 of the coupling element 200 at an angle 225. In order to provide an effective optical signal transmission at the bottom surface 230, material is removed from the bottom surface 230 until the end section 221 of the optical path forms a tapered optical coupling surface 227 at the bottom surface 230.

To couple the light adiabatically from the glass block to the waveguide on the PLC the waveguide in the glass block may need to be tapered to a point. The FLDW technology may not write such narrow tips as with silicon photonics. A refinement of the technique is to introduce a vertical taper as well as a lateral taper. The effective index change along the taper can be increased if there is a vertical taper. It is proposed to write a waveguide at a small angle to the surface and then to polish back, i.e. to remove material from the bottom surface 230. This can be done at wafer level.

Figure 8:
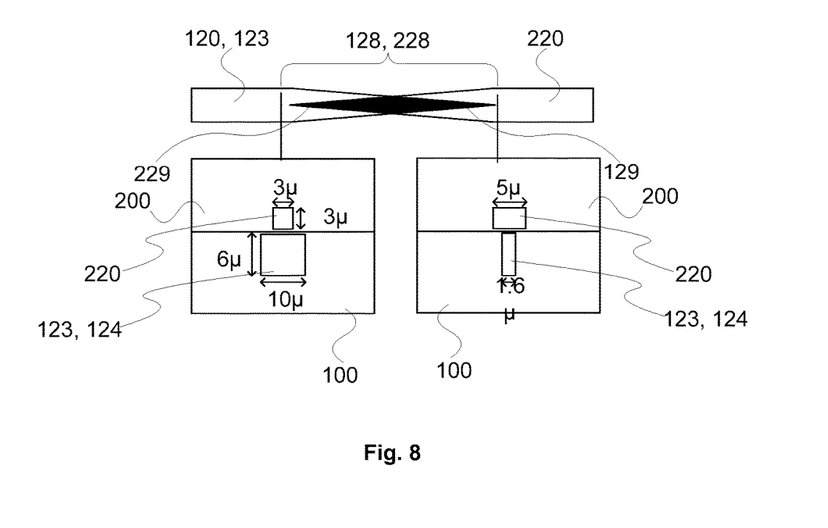
FIG. 8 schematically shows coupling of optical signals from the coupling element to the lightwave circuit in an optical coupling arrangement according to another exemplary embodiment of the invention.

FIG. 8 schematically illustrates a top view on the coupling region shown in FIG. 4. The optical waveguide 120 and the upper cladding 123 extend from the left to the right and an end section 128 of the optical waveguide 120 tapers down in the same direction to the end 129. The optical path 220 extends from the right to the left and an end section 228 tapers down to the end 229 from right to left. The end sections 128 and 228 overlap in an overlapping region. The length of the overlapping region (end sections 128, 228) may be about 2 mm.

Below the top view of the overlapping waveguide 120 and the optical path 220, two cross sectional views are shown indicating the profile of the waveguide 120 and the optical path 220 at different positions in the overlapping area, respectively. The gap between the waveguide 120 and the optical path may be about 1 µm.

On the lower left corner, the end section of the optical path 220 within the glass block 200 is shown having a cross section of 3 µm×3 µm and directly below the cross section of the lower and upper cladding 123, 124 of the waveguide 120 is shown having a cross section of 6 µm×10 µm. This indicates the cross sections at the end 229 of the optical path 220.

On the lower right corner, the opposite situation is shown at the end 129 of the waveguide 120. At this end 129, the cross section of the waveguide 120 is about 1.6 µm×6 µm and the cross section of the optical path 220 is 5 µm×3 µm.

By the opposite tapering directions of the waveguide 120 and the optical path 220, the efficiency of optical signal transmission from the waveguide 120 to the optical path 220 and vice versa is increased.

LIST OF REFERENCE SIGNS 10 optical coupling arrangement
20 coupling region
100 lightwave circuit
110 first surface area
120 optical waveguide
122 core
123 upper cladding
124 lower cladding
125 second recess
126 second filler material
128 end section of the optical waveguide
129 end of upper and lower cladding
130 first recess
135 first filler material
200 coupling element
202 first junction zone
204 perpendicular offset
210 lateral surface area
220 optical path
221 end section
225 inclination angle
227 optical coupling surface
228 end section of optical path
229 end of optical path
230 bottom surface area
240 second lateral surface area
300 optical waveguide element
310 cladding
320 core.

What is claimed is:

1. An optical coupling arrangement, comprising:
   a lightwave circuit;
   a coupling element; and
   an optical waveguide element;
   wherein the lightwave circuit has a first surface area;
   wherein the coupling element is attached to the first surface area such that an optical signal can be transmitted from the lightwave circuit to the coupling element;
   wherein the optical waveguide element is attached to the coupling element at a first junction zone such that the optical signal can be transmitted from the coupling element to the optical waveguide element;
   wherein the coupling element is configured to perform mode transformation for the optical signal transmitted from the lightwave circuit to the optical waveguide element such that adiabatic coupling of the optical signal to the optical waveguide element is enabled;
   wherein the coupling element is a glass block used as a mode converter between the lightwave circuit and the optical waveguide element.

2. The optical coupling arrangement according to claim 1, wherein the first junction zone is arranged at a lateral surface area of the coupling element;
   wherein the lateral surface area of the coupling element extends perpendicular to the first surface area of the lightwave circuit.

3. The optical coupling arrangement according to claim 1, wherein the coupling element comprises at least one optical path optically connecting the first junction zone with the first surface area of the lightwave circuit.

4. The optical coupling arrangement according to claim 3, wherein the at least one optical path extends perpendicular to a lateral surface area of the coupling element and along a bottom surface area of the coupling element.

5. The optical coupling arrangement according to claim 1, wherein an optical waveguide is arranged at the first surface area of the lightwave circuit and the coupling element and a coupling region are configured to transmit an optical signal to the optical waveguide;
   wherein the optical waveguide comprises a core, an upper cladding and a lower cladding;
   wherein a refractive index of the upper cladding is lower than a refractive index of an optical path in the coupling element.

6. The optical coupling arrangement according to claim 5, wherein the optical waveguide at least partially extends along a bottom surface area of the coupling element.

7. The optical coupling arrangement according to claim 5, wherein an end section of the optical waveguide is tapered towards an end of the optical waveguide.

8. The optical coupling arrangement according to claim 7, wherein an end section of the optical path and an end section of the optical waveguide are arranged in a coupling region where light is coupled from one of the optical path and the optical waveguide to the other one.

9. The optical coupling arrangement according to claim 6, wherein a first recess is formed in the first surface area of the lightwave circuit and a first filler material is inserted in the first recess;
   wherein a refractive index of the first filler material is lower than a refractive index of the upper cladding and/or the lower cladding;
   wherein the first filler material at least partially extends along the bottom surface area of the coupling element.

10. The optical coupling arrangement according to claim 5, wherein the upper cladding of the optical waveguide comprises a second recess and the coupling element is arranged in the second recess.

11. The optical coupling arrangement according to claim 5, wherein the upper cladding of the optical waveguide comprises a second recess and a second filler material is arranged in the second recess;
    wherein a refractive index of the second filler material is higher than the refractive index of the upper cladding and the lower cladding.

12. The optical coupling arrangement according to claim 5, wherein an optical path extends through the coupling element from the first junction zone to a lateral surface area of the coupling element;
    wherein the optical waveguide is optically coupled to the lateral surface area;
    wherein the coupling element is configured to transmit optical signals from the lateral surface area to the first junction zone via the optical path.

13. The optical coupling arrangement according to claim 7, wherein an end section of the core is tapered towards the end of the optical waveguide.

14. The optical coupling arrangement according to claim 7, wherein an end section of the optical path is tapered towards an end of the optical path.

15. An optical coupling arrangement, comprising:
    a lightwave circuit;
    a coupling element; and
    an optical waveguide element;
    wherein the lightwave circuit has a first surface area;
    wherein the coupling element is attached to the first surface area such that an optical signal can be transmitted from the lightwave circuit to the coupling element;
    wherein the optical waveguide element is attached to the coupling element at a first junction zone such that the optical signal can be transmitted from the coupling element to the optical waveguide element;
    wherein the coupling element is configured to perform mode transformation for the optical signal transmitted from the lightwave circuit to the optical waveguide element such that adiabatic coupling of the optical signal to the optical waveguide element is enabled;
    wherein an optical waveguide is arranged at the first surface area of the lightwave circuit and the coupling element and a coupling region are configured to transmit an optical signal to the optical waveguide;
    wherein the optical waveguide comprises a core, an upper cladding and a lower cladding;
    wherein a refractive index of the upper cladding is lower than a refractive index of an optical path in the coupling element;
    wherein the optical waveguide at least partially extends along a bottom surface area of the coupling element;
    wherein a first recess is formed in the first surface area of the lightwave circuit and a first filler material is inserted in the first recess;
    wherein a refractive index of the first filler material is lower than a refractive index of the upper cladding and/or the lower cladding;
    wherein the first filler material at least partially extends along a bottom surface area of the coupling element.

* * * * *